March 12, 1940.  G. P. THOMAS  2,193,148
SHEAR
Filed March 30, 1938   2 Sheets-Sheet 1
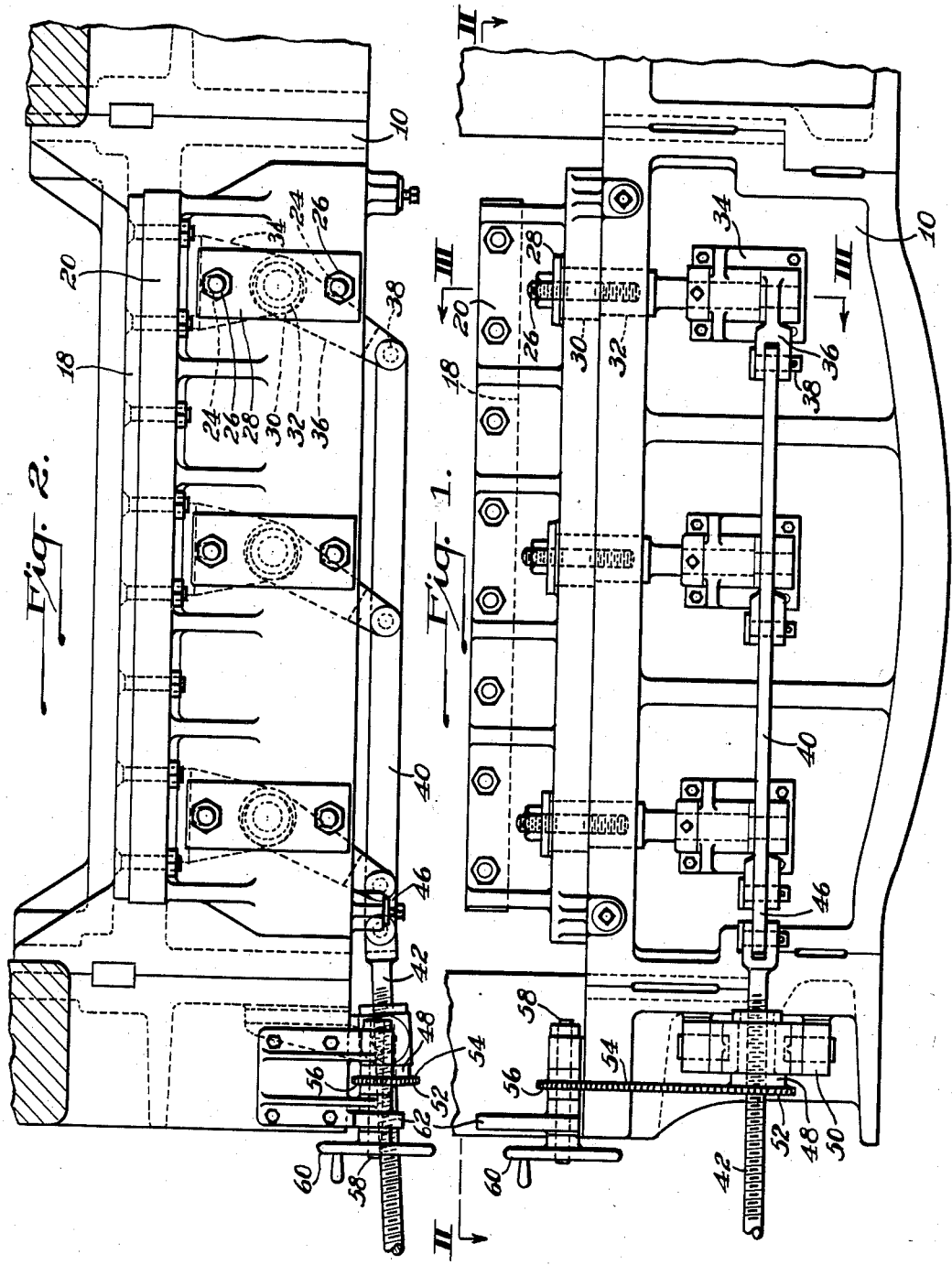
WITNESSES
A B Wallace
A H Oldham
INVENTOR.
George P. Thomas
BY Brown, Critchlow + Flick
his ATTORNEYS.

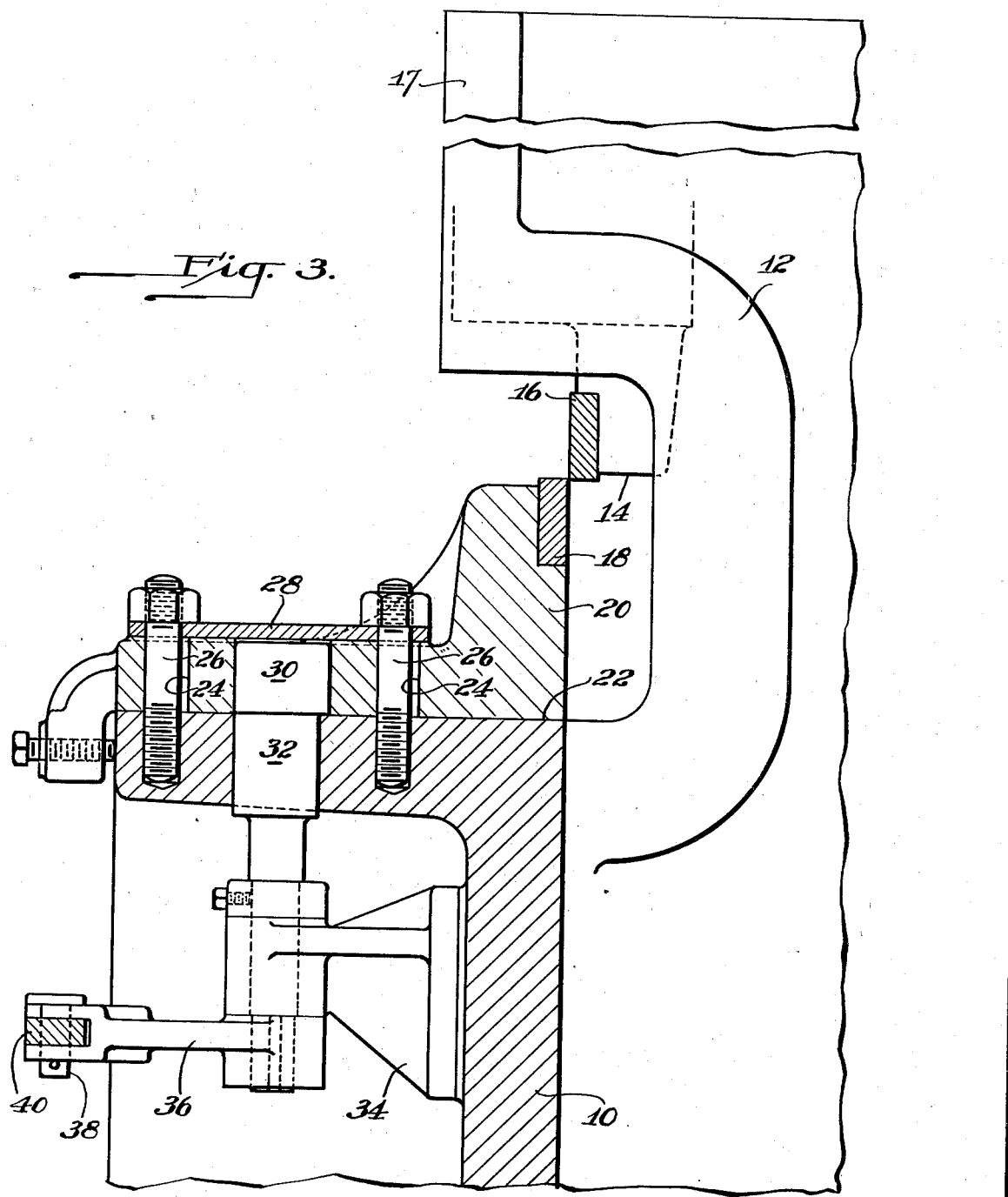

Patented Mar. 12, 1940

2,193,148

UNITED STATES PATENT OFFICE 2,193,148

SHEAR

George P. Thomas, Glenshaw, Pa.

Application March 30, 1938, Serial No. 198,861

9 Claims. (Cl. 164—47)

This invention relates to shears adapted for cutting metal or similar material, and more particularly is concerned with the provision of readily operable mechanism for changing the clearance between the shear blades to best adapt the shear for operation on material of a particular thickness.

Heretofore, it has been proposed to change the clearance between shear blades, as for example, in order to compensate for wear or to insure the proper clearance of the shear blades in the assembly of the shear. Such adjustment of the shear blades has been by screws, wedges or other similar means which are positioned at a plurality of points along the length of at least one of the shear blades and which can be adjusted in turn by suitable wrenches to effect the clearance desired. However, once the adjustment has been made, it is ordinarily not disturbed for many days in the operation of the shear. It will be seen that such adjusting means are not adapted to the quick and ready adjustment of the clearance of the shear blades, as for example, to change the clearance of the blades to best adapt the shear to operate upon material of a particular thickness. Nor are such adjusting means ordinarily operable during the continued use of the shear.

It is the general object of my invention to avoid and overcome the foregoing and other difficulties of and objections to known shear blade adjustments by the provisions of relatively simple and inexpensive mechanism whereby the clearance between cooperating shear blades can be rapidly, and in fact almost instantaneously, adjusted to provide a desired clearance between the shear blades.

Another object of my invention is the provision of a shear having a single readily operable control for setting the clearance between cooperating shear blades to best adapt the shear to operate upon material of a particular thickness.

Another object of my invention is the provision of a shear having cooperating blades and in which the clearance between the blades is determined by a plurality of simultaneously operated eccentrics, usually positioned in a line parallel to the shear blades.

The foregoing and other objects of my invention are achieved by the provision of a shear including a pair of relatively movable blades, a support for one of the blades, and means slidably mounting the support for movement substantially at right angles to the direction of shearing movement of the blades. A plurality of eccentrics are provided to control the position of the support on its mounting means and other means connect the several eccentrics for simultaneous rotary movement. A hand wheel, lever or the like controls the operation of the last-named means connecting the several eccentrics, and when operated functions to quickly and accurately set the shear blades to have a desired clearance between them best adapted to the shearing of material of a certain gauge or thickness.

For a better understanding of my invention, reference should be had to the accompanying drawings, wherein Fig. 1 is a front elevation of one form of shear incorporating the principles of my invention; Fig. 2 is a horizontal sectional view taken on line II—II of Fig. 1; and Fig. 3 is a vertical sectional view taken on line III—III of Fig. 1.

While my invention broadly is applicable to shears of various types and sizes and capable of operation upon material of widely varying characteristics, it is particularly adapted to relatively heavy shears for operating upon metal and specifically metal of plate thickness, for example, up to two inches or more thickness, and wherein the thickness of the plate varies considerably during a day's run. Such shears ordinarily include comparatively long, relatively reciprocable shear blades, one of which is usually fixed and the other of which is usually carried in vertically extending guides for reciprocation by cranks or eccentrics. Accordingly, my invention has been illustrated and will be described in conjunction with a shear of this general type as built to incorporate the principles of my invention.

Having particular reference to the drawings, the numeral 10 indicates a frame having an upright portion 12 which slidably receives a ram 14 carrying a movable shear blade 16. The means for reciprocating the ram are indicated as a whole by the numeral 17 and may comprise any standard and well-known eccentric or toggle mechanism, so that such means have not been described in detail. Cooperating or associated with the movable shear blade 16 is a vertically fixed shear blade 18 which is carried by a bracket 20 in turn slidably supported on a bed 22 of the frame 10 for limited and adjustable horizontal movement.

In the form of my invention illustrated, the position of the bracket 20 on the bed 22 is controlled by providing the bracket 20 with vertical holes 24 through which bolts 26 of less diameter than the holes extend into the bed 22. The bolts 26 preferably hold a cover plate 28 in position above the bracket 20. The clearance between the bolts 26 and the holes 24 provides for the limited horizontal movement of the bracket, as will be understood.

The actual adjusting means preferably take the form of eccentrics 30, of which there are usually several, for example three as shown, which eccentrics may be formed integrally with shafts 32. The shafts 32 have bearing in the bed 22 and in bearing brackets 34 secured to the frame 10. A crank lever 36 is keyed or otherwise fixed to the lower end of each shaft 32 and extends horizontally to the front of the shear frame where it is pivotally secured, as by a pin 38, to a link 40. The link 40 is connected to a screw 42 by a short link 46. The screw 42 extends through a threaded hub 48 rotatably carried in a suitable bearing support 50 at one end of the frame 10.

The internally threaded hub 48 is adapted to be rotated to achieve movement of the screw and thus the rotation of the eccentrics 30 and the horizontal adjustment of the bracket 20. The rotation of the hub may be accomplished by forming a sprocket gear 52 thereon which receives a chain 54 extending to a sprocket gear 56 carried on a shaft 58 journaled upon the bed 22 and having a hand wheel 60 secured to one end thereof. Suitable scale or gauge indicating means 62 may be associated with the hand wheel 60 in a position to be visible to the operator so that the hand wheel can be turned to set the shear blades at the proper clearance for a particular shearing operation merely by watching the indicating means.

In the operation of the shear as just described, if comparatively thin sheets of material are to be cut, the hand wheel 60 is turned, usually to the indexed or gauged position of the scale 62, so that the vertically fixed shear blade 18 is moved horizontally to a position to just clear the vertically movable shear blade 16. The horizontal movement of the vertically fixed shear blade 18 is achieved through the rotation of the hand wheel 60, sprocket gear 56, chain 54, sprocket gear 52 and internally threaded hub 48. The rotation of the threaded hub on the screw 42 moves the screw in and out of the hub 48 to move the link 40 and swing the crank levers 36 about identical arcs. The crank levers 36 move the shafts 32 through similar arcs and this rotates the eccentrics 30 which control the position of the bracket 20 on the bed 22.

When relatively heavy material, such as a metal plate, for example two inches thick, is to be sheared, the hand wheel 60 is rotated in the opposite direction to a suitably indicated position, as shown by the means 62, to rock the eccentrics 30 in the other direction and thereby move the shear blade 18 a predetermined fixed distance horizontally from the vertically reciprocable shear blade 16. In the embodiment of the invention illustrated, the horizontal clearance between the shear blades when working on thick material, such as metal plates, may be up to or over three-eighths of an inch. This has been found to prevent binding of the shear in operation and to greatly reduce the loads on the shear blades and the frame of the apparatus, as well as noticeably decreasing the power required to operate the shear.

From the foregoing it will be recognized that the objects of my invention have been achieved by the provision of relatively simple, inexpensive mechanism for rapidly and positively achieving the desired clearance between shear blades operable upon material of different thickness. A single hand control, which is usually provided with a suitable scale gauge or other index, can be quickly moved to effect the complete adjustment of the shear blade. The normal function and operation of the shear is not interfered with, and the adjustable mechanism in no way reduces the strength of the shear but instead, as above indicated, acts to noticeably reduce the strains on the shear and the power required to cut material of different thickness.

While in accordance with the patent statutes I have specifically illustrated and described one embodiment of my invention, it should be understood that the invention is not limited thereto or thereby but is defined in the appended claims.

I claim:

1. A shear comprising a pair of relatively movable blades of considerable length, a plurality of means spaced at intervals along at least one of the blades for changing the clearance between the blades to facilitate shearing of material of different thickness, and a control means for rapidly and simultaneously operating all of the clearance changing means.

2. A shear comprising a pair of relatively movable blades of considerable length, a plurality of means along at least one of the blades for changing the clearance between the blades, a single control means for rapidly and simultaneously operating all of the clearance changing means, and a scale associated with the control means.

3. In combination in a shear, a bed, a bracket, means slidably supporting the bracket for limited horizontal movement on the bed, a shear blade secured to the bracket, a vertically reciprocable shear blade associated with the shear blade on the bracket, a plurality of shafts journaled in the bed and spaced along the shear blades, cams carried by the shafts and engaging with cam portions on the bracket, and means for simultaneously rocking the shafts to change the clearance between the shear blades.

4. In combination in a shear, a bed, a bracket, means slidably supporting the bracket for limited horizontal movement on the bed, a shear blade secured to the bracket, a vertically reciprocable shear blade associated with the shear blade on the bracket, a plurality of substantially vertically extending shafts journaled in the bed substantially in parallel alignment with the shear blades, cams carried by the shafts and engaging with cam portions on the bracket, a crank arm secured to each shaft adjacent its lower end, a link pivotally connecting the several crank arms together, and means for moving the link to change the clearance between the shear blades.

5. In combination in a shear, a bed, a bracket, means slidably supporting the bracket for limited horizontal movement on the bed, a shear blade secured to the bracket, a vertically reciprocable shear blade associated with the shear blade on the bracket, a plurality of vertically extending shafts journaled in the bed substantially in parallel alignment with the shear blades, cams carried by the shafts and engaging with cam portions on the bracket, a crank arm secured to each shaft adjacent its lower end, a link pivotally connecting the several crank arms together, a screw connected to the link, a nut journaled in the bed and receiving the screw, and hand means to rotate the nut.

6. In combination in a shear, a bed, a bracket, means slidably supporting the bracket for limited horizontal movement on the bed, a shear blade secured to the bracket, a vertically reciprocable shear blade associated with the shear blade on the bracket, a plurality of vertically extending shafts journaled in the bed substantially in parallel alignment with the shear blades, cams carried by the shafts and engaging with cam portions on the bracket, a crank arm secured to each shaft adjacent its lower end, a link pivotally connecting the several crank arms together, a screw connected to the link, a nut journaled in the bed and receiving the screw, hand means to rotate the nut, and a gauge scale associated with the hand means.

7. A shear comprising a pair of relatively movable blades, a support for one of the blades, means slidably mounting the support for movement substantially at right angles to the direction of shearing movement of the blades, a plurality of means controlling the position of the support on the support mounting means, and a single control means for simultaneously and substantially instantaneously operating the plurality of means.

8. A shear comprising a pair of relatively movable blades, a support for one of the blades, means slidably mounting the support for movement substantially at right angles to the direction of shearing movement of the blades, a plurality of eccentrics controlling the position of the support on the support mounting means, linkage means connecting the several eccentrics for simultaneous rotary movement, and a rotary hand wheel for rapidly controlling the operation of the last-named means to quickly and accurately set the blades to have a desired clearance between them best adapted to the shearing of a material of a certain gauge.

9. A shear comprising a pair of relatively movable blades, a support for one of the blades, means mounting the support for movement substantially at right angles to the direction of shearing movement of the blades, a plurality of cams controlling the position of the support on the support mounting means, means connecting the several cams for simultaneous rotary movement, and hand means for rapidly controlling the operation of the last-named means to quickly and accurately set the blades to have a desired clearance between them best adapted to the shearing of a material of a certain gauge.

GEORGE P. THOMAS.